United States Patent Office 3,318,974
Patented May 9, 1967

3,318,974
UNSATURATED POLYESTER CURING SYSTEM CONSISTING OF CUMENE HYDROPEROXIDE, METHYLETHYL KETONE PEROXIDE AND THIOGLYCOLIC ACID
Lewis Montesano, Little Falls, N.J., assignor to Bell Telephone Laboratories, Incorporated, New York, N.Y., a corporation of New York
No Drawing. Filed Mar. 23, 1965, Ser. No. 442,199
3 Claims. (Cl. 260—865)

This invention relates to a process for curing styrene polyesters. More particularly, the present invention is directed to a novel method for curing unsaturated styrene polyesters with a catalyst system including cumene hydroperoxide, methylethylketone peroxide and thioglycolic acid.

The styrene polyesters are of recent origin and have acquired wide use in such applications as laminates, castings, moldings, et cetera. These compositions are, typically, prepared by reacting an unsaturated dibasic acid, such as maleic anhydride, with a glycol, such as diethylene glycol. The resultant composition is generally viscous and, in some cases, solid in nature. In order to form solutions of controllable and moderate viscosity, the polyesters are dissolved in a vinyl monomer, such as styrene. The styrene polyester solution so prepared may then be cured to an insoluble, infusible condition by heating in the presence or absence of a curing catalyst.

Heretofore, it has been common practice by workers in the art to employ curing catalysts which decompose upon the application of heat or ultraviolet light into free radicals which serve to initiate polymerization. It is well known that the rate of peroxide decomposition and formation of free radicals increases with increasing temperatures. Accordingly, the rate of polymerization can generally be controlled by exercising temperature control.

Although satisfactory in most applications, it has been found that the elevated temperatures employed in such curing processes often tend to have an adverse effect upon the properties of the resultant product, so prompting workers in the art to develop a room temperature curing system.

In order to effect room temperature gelation of the styrene polyesters, it is necessary to employ an accelerator which reacts chemically with the catalyst and causes the rapid formation of free radicals at room temperature. For this purpose, organic-soluble cobalt salts, such as cobalt naphthenate and cobalt octoate have been found useful.

Unfortunately, such room temperature curing systems are not completely free of defects. More specifically, it has been found that discoloration and cracking of the resinous product often occurs, so limiting its use in certain applications.

In accordance with the present invention, a technique is described for curing styrene polyesters wherein the prior art problems alluded to above are effectively overcome. The inventive technique involves curing the polyesters to a water white product over a time interval ranging from 3 to 120 minutes with a catalyst system comprising cumene hydroperoxide, methylethylketone peroxide and thioglycolic acid at room temperature.

It has been found that critical proportions of each of the constituent components of the catalyst system are required in order to effect curing without adversely affecting the properties of the product. Thus, it has been found that the cumene hydroperoxide and thioglycolic acid must be present in the catalyst system in amounts within the range of 0.05 to 1 part, by weight, based on 100 parts, by weight, of styrene polyester. Similarly, it has been found essential to employ methylethylketone peroxide in an amount ranging from 0.1 to 1 part, by weight, based on 100 parts, by weight, of styrene polyester. Variations beyond the noted maximum have been found to result in cracking due to rapid polymerization whereas the use of amounts less that the noted minima are unpractical from a standpoint of reaction time.

The noted catalysts are obtained from commercial sources or by standard methods described in the literature.

The present inventive technique as described above may be effected at room temperature. For the purposes of this invention, room temperature is defined as including ordinary room or ambient temperatures, typically within the range of 20 to 25° C. although temperatures higher and lower may be employed. It is intended to include any curing process not requiring the application of heat. The cure may be accomplished by merely mixing the styrene polyester with the organic peroxides and then the thioglycolic acid or vice versa. The process may be carried out in unusually short periods of time, typically of the order of one-half to one-tenth the time required for curing by conventional techniques. The advantage of such cure lies in the diminution of the effect of elevated temperatures which may lead to considerable discoloration of the product or a lessening of the flexural strength.

The styrene polyesters employed in the practice of the present invention are well known in the art and obtained from commercial sources or by techniques described in the literature. (See "Styrene—Its Polymers, Copolymers and Derivatives," Boemdy-Boyer, Reinhard Publishing Corporation, New York, 1952.)

The following examples are given by way of illustration and are not to be construed as limitations of this invention, many variations of which are possible within the scope and spirit thereof.

*Example I*

A mixture of 100 parts of the styrene polyester, formed by mixing 70 parts of the reaction product of phthalic anhydride, maleic anhydride and propylene glycol with styrene, having a viscosity within the range of 600 to 750 centipoises and a specific gravity within the range of 1.11 to 1.13, 0.25 part of cumene hydroperoxide, 0.5 part of methylethylketone peroxide and 0.5 part of thioglycolic acid was prepared. The mixture was thoroughly stirred to blend the ingredients and maintained at room temperature. In 5 minutes, the mixture gelled and a water-white hard resin without cracks was obtained.

*Example II*

The procedure of Example I was repeated with the exception that 0.25 part of thioglycolic acid was employed. In 5 minutes the mixture gelled and a water-white, hard, crack-free resin was obtained.

While the invention has been described in detail in the foregoing specification, it will be appreciated by those skilled in the art that various modifications may be made without departing from the spirit and scope of the invention, reference being had to the appended claims.

What is claimed is:

1. A method for curing a styrene polyester prepared by reacting an unsaturated dibasic acid with a glycol and a vinyl monomer, which comprises adding a mixture to said polyester consisting of (a) cumene hydroperoxide in an amount within the range of 0.05–1.0 part by weight, (b) methyethylketone peroxide in an amount within the range of 0.1–1.0 part by weight, and (c) thioglycolic acid in an amount within the range of 0.05–1.0 part by weight, the said parts by weight being based upon 100 parts by weight of said polyester.

2. A method in accordance with the procedure of claim 1 wherein said styrene polyester is a mixture of 70 parts of the reaction product of maleic anhydride, phthalic anhydride and propylene glycol with 30 parts of monomeric styrene.

3. A method in accordance with the procedure of claim 2 wherein 0.25 part, by weight, cumene peroxide, 0.5 part, by weight, methylethylketone peroxide and 0.5 part, by weight, thioglycolic acid is employed.

References Cited by the Examiner

UNITED STATES PATENTS

| | | | |
|---|---|---|---|
| 2,466,800 | 4/1959 | Fisk | 260—865 |
| 3,003,991 | 10/1961 | Marszewski et al. | 260—865 |
| 3,238,274 | 3/1966 | Allan | 260—865 |

FOREIGN PATENTS

| | | |
|---|---|---|
| 249,956 | 2/1962 | Australia. |
| 558,928 | 6/1958 | Canada. |

SAMUEL H. BLECH, *Primary Examiner.*

MURRAY TILLMAN, *Examiner.*

J. T. GOOLKASIAN, *Assistant Examiner.*